(12) United States Patent
Salter et al.

(10) Patent No.: US 12,540,585 B2
(45) Date of Patent: Feb. 3, 2026

(54) SYSTEM AND METHOD FOR POWER TAKE-OFF CONTROL

(71) Applicant: Ford Global Technologies, LLC, Dearborn, MI (US)

(72) Inventors: Stuart C. Salter, White Lake, MI (US); Brendan Diamond, Grosse Pointe, MI (US); Bryan Wilbur Hoy, South Lyon, MI (US); Todd Ansbacher, Westland, MI (US); Jon Holt, Howell, MI (US); Ryan Delaney, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 18/424,046

(22) Filed: Jan. 26, 2024

(65) Prior Publication Data
US 2025/0243821 A1 Jul. 31, 2025

(51) Int. Cl.
*F02D 41/00* (2006.01)
*F02D 41/02* (2006.01)

(52) U.S. Cl.
CPC ...... *F02D 41/0215* (2013.01); *F02D 2200/50* (2013.01)

(58) Field of Classification Search
CPC .................. F02D 41/0215; F02D 2200/50
See application file for complete search history.

(56) References Cited

U.S. PATENT DOCUMENTS

| | | | | |
|---|---|---|---|---|
| 4,961,721 A | * | 10/1990 | Sword | F16H 47/06 475/47 |
| 5,121,607 A | * | 6/1992 | George, Jr. | F02B 39/04 60/618 |
| 5,480,364 A | * | 1/1996 | Hilbert | B60W 10/06 477/107 |
| 6,019,702 A | * | 2/2000 | Ehrenhardt | B60K 17/28 477/107 |
| 6,060,981 A | * | 5/2000 | Landes | B60R 25/04 340/426.12 |
| 6,363,906 B1 | * | 4/2002 | Thompson | F02N 11/0803 123/198 DB |
| 7,310,576 B1 | * | 12/2007 | Letang | F02D 41/08 701/112 |
| 7,702,450 B2 | * | 4/2010 | Pfohl | E02F 9/2062 701/112 |
| 8,435,158 B2 | * | 5/2013 | Mizoguchi | F02N 11/084 477/111 |
| 8,475,330 B2 | * | 7/2013 | Kaltenbach | B60W 10/02 477/5 |
| 10,021,467 B1 | * | 7/2018 | Dunbar | B65F 3/00 |
| 10,289,651 B2 | | 5/2019 | McQuade et al. | |
| 11,203,988 B1 | * | 12/2021 | Glugla | F02D 9/08 |
| 11,938,942 B2 | * | 3/2024 | Wutzke | B66C 23/40 |
| 2005/0155170 A1 | * | 7/2005 | Charky | E01H 1/05 15/82 |

(Continued)

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems for operating a vehicle powertrain that includes a power take-off are presented. In one non-limiting example, engine speed may be adjusted to increase engine efficiency during conditions when the engine is operating at idle conditions for longer than a threshold amount of time so that fuel consumption and wear may be reduced.

15 Claims, 5 Drawing Sheets

(56) References Cited

U.S. PATENT DOCUMENTS

| | | | | |
|---|---|---|---|---|
| 2006/0063642 | A1* | 3/2006 | Hawkins | F02D 41/16 |
| | | | | 477/107 |
| 2009/0018716 | A1* | 1/2009 | Ambrosio | B60L 7/14 |
| | | | | 903/906 |
| 2009/0234563 | A1* | 9/2009 | Pfohl | F02D 41/0205 |
| | | | | 701/112 |
| 2010/0100306 | A1* | 4/2010 | Gamache | F02N 11/0803 |
| | | | | 701/113 |
| 2012/0258838 | A1* | 10/2012 | Hartz | B60K 6/48 |
| | | | | 180/65.23 |
| 2013/0282242 | A1* | 10/2013 | Park | F02D 41/08 |
| | | | | 701/50 |
| 2013/0296101 | A1* | 11/2013 | Doering | B60W 30/18 |
| | | | | 180/65.265 |
| 2013/0345914 | A1* | 12/2013 | Love | B60W 10/11 |
| | | | | 701/22 |
| 2017/0240159 | A1* | 8/2017 | Foster | B60K 17/02 |
| 2018/0179981 | A1* | 6/2018 | Homant | F02D 41/0002 |
| 2019/0140474 | A1* | 5/2019 | Stoltz | B60K 25/06 |

\* cited by examiner

SYSTEM AND METHOD FOR POWER TAKE-OFF CONTROL

FIELD

The present description relates generally to methods and systems for controlling a power take off of a vehicle.

BACKGROUND AND SUMMARY

A vehicle may include a power take-off that provides a way of transferring power from the vehicle's driveline to devices that are external from the vehicle's powertrain. The power take-off may be included in a transmission at a location in the transmission that is downstream of a torque converter and upstream of an output shaft of the transmission. Some vehicles, especially commercial vehicles, may operate at engine idle conditions for long periods of time due to the type of activity the vehicles are engaged in. The vehicle's power take-off may be activated or deactivated when the vehicle is operating at idle conditions. Furthermore, engine idle conditions may be different when the vehicle's transmission is engaged in park or neutral as compared to when the vehicle's transmission is engaged in a forward or reverse gear. Operating the engine at idle may increase vehicle fuel consumption and reduce engine life. Therefore, it may be desirable to provide a way of operating an engine and vehicle such that vehicle fuel consumption may be reduced and engine life may be extended.

The inventors herein have recognized the above-mentioned issues and have developed a method for operating a powertrain of a vehicle, comprising: via a controller, adjusting an engine rotational speed when a power take-off positioned downstream of a torque converter is engaged in response to an actual total amount of time an engine is at idle conditions exceeding a threshold amount of time and engine efficiency being more than a threshold engine efficiency away from a predetermined engine efficiency, where the actual total amount of time the engine is at idle begins from a most recent time the engine entered idle conditions.

By adjusting a speed of an engine in response to an actual total amount of time an engine is at idle conditions exceeding a threshold amount of time, it may be possible to provide the technical result of reducing fuel consumption and increasing engine life. In particular, if a vehicle has been idling for longer than a threshold amount of time, it may be possible to reduce fuel consumption by the engine via reducing engine speed. The lower engine speed may also reduce engine wear and extend engine life.

The present description may provide several advantages. Specifically, the approach may reduce engine fuel consumption. Further, the approach may reduce engine wear if the engine is operating at a higher engine idle speed. Additionally, the approach may utilize prior vehicle operating conditions so that power take-off performance may be to present vehicle operation.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
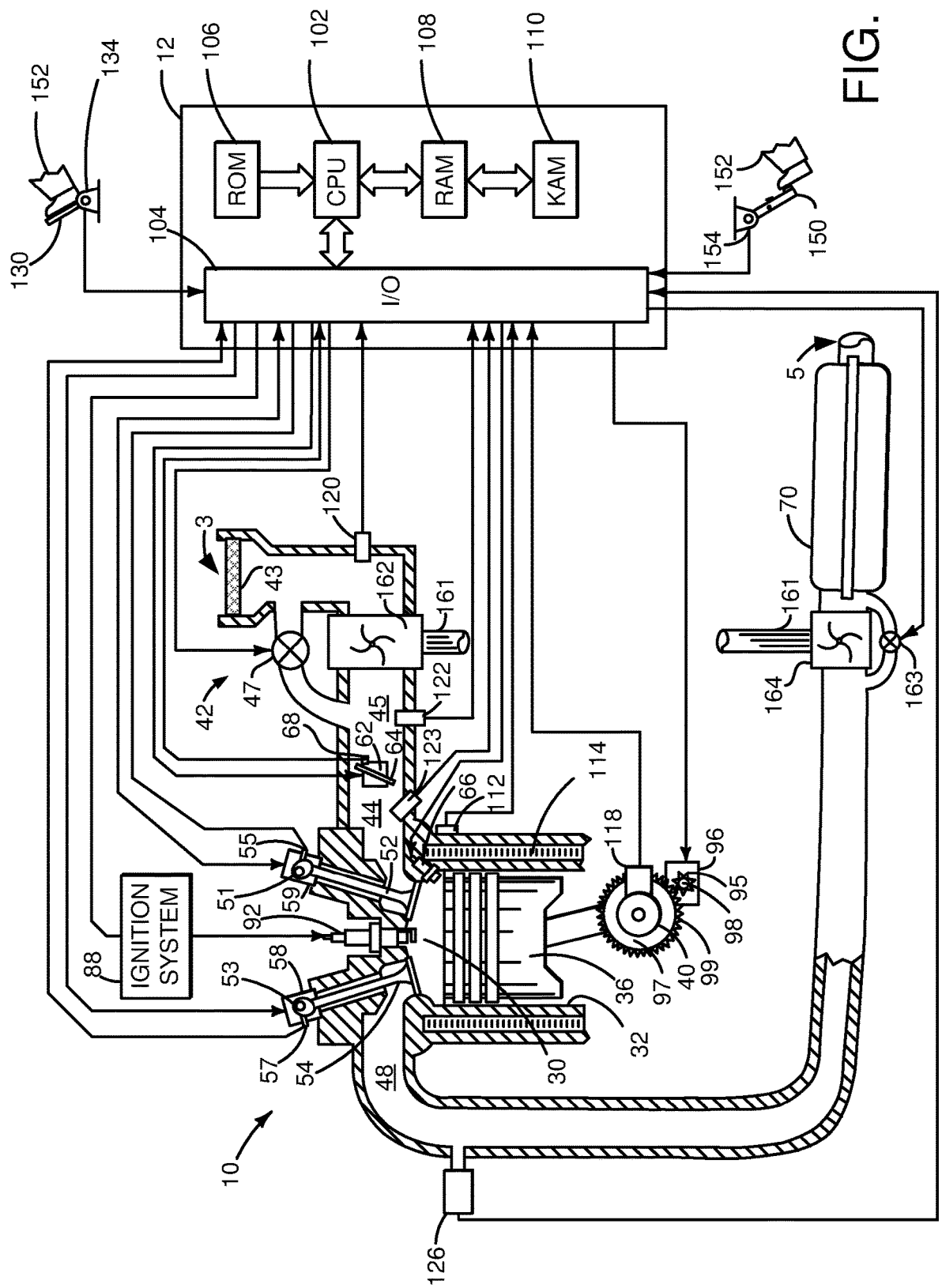
FIG. 1 shows a schematic depiction of an engine.
Figure 2:
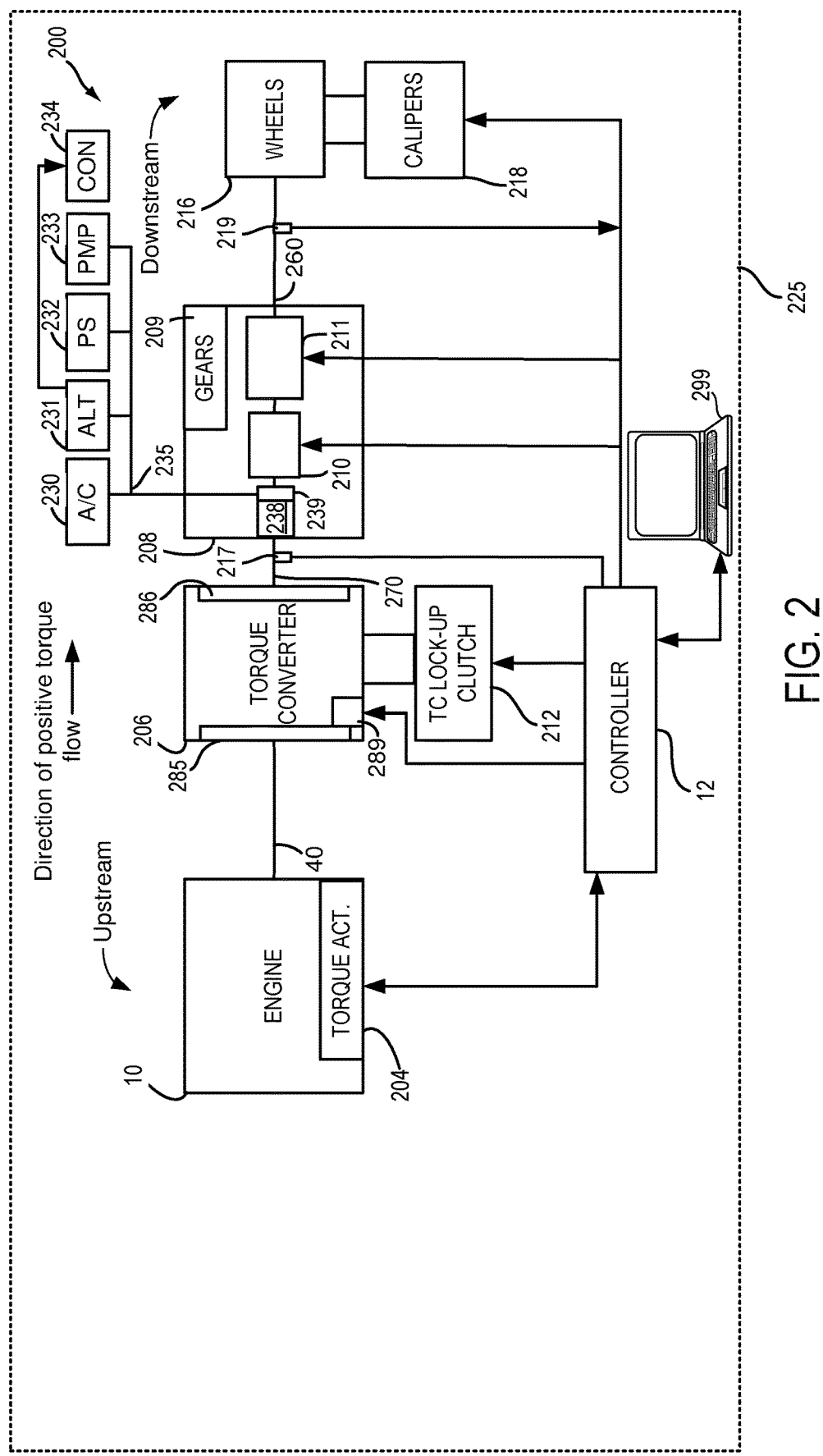
FIG. 2 shows a schematic depiction of an example vehicle powertrain including an engine.
Figure 3:
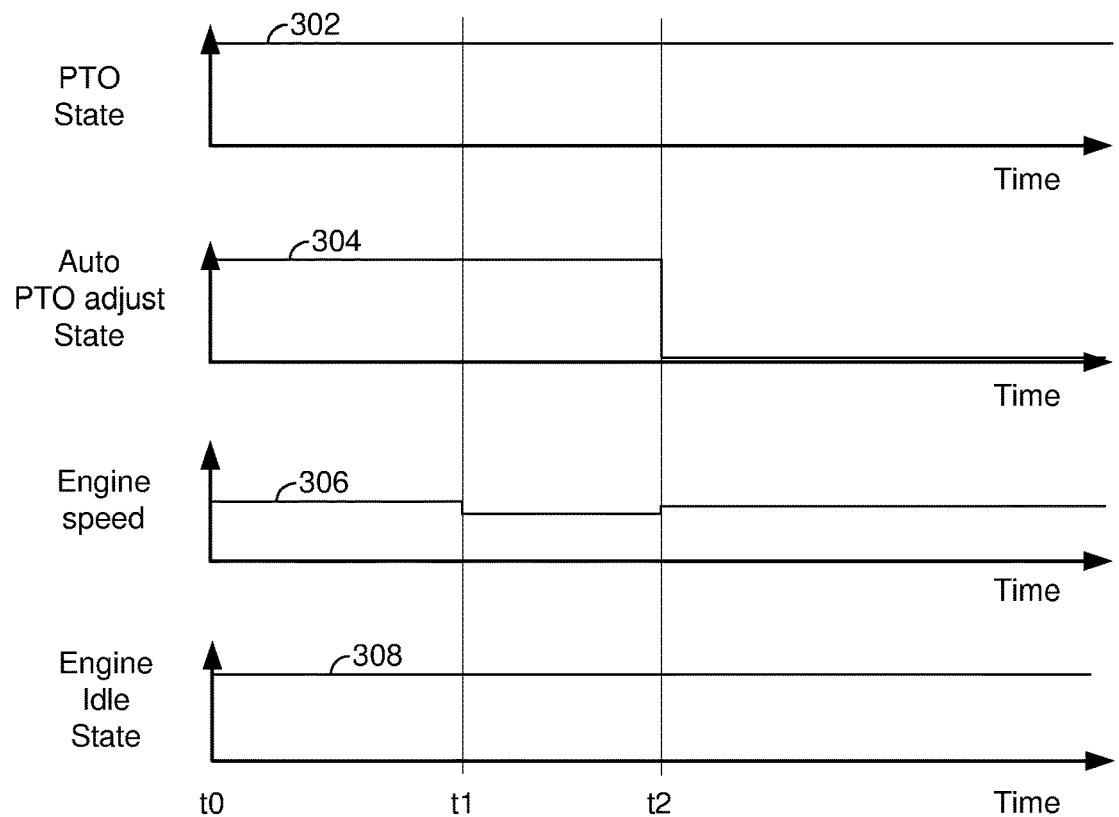
FIG. 3 shows example plots of an example power take-off operating sequence.

The present description is related to operating a vehicle powertrain that includes a power take-off of a transmission. The power take-off may supply mechanical power to devices that are external to a vehicle powertrain. If the power take-off is engaged but the device being driven changes from a state of loading the power take-off to a state of not loading the power take-off, the operation of an engine may be adjusted automatically to conserve fuel. Further, operation of the engine may be adjusted to reduce fuel consumption and engine wear during conditions where the engine is operating at an elevated idle speed for longer than a threshold amount of time. The power take-off may be powered via an engine of the type that is shown in FIG. 1. The power take-off may be incorporated into a powertrain as shown in FIG. 2. The power take-off may be operated as shown in the sequence of FIG. 3. The vehicle and power take-off may be operated according to the method of FIG. 4. Engine efficiency may be increased based on an engine fuel consumption map as shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown)

including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by foot 152; a position sensor 154 coupled to caliper application pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a powertrain 200. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to impeller 285 of torque converter 206. Torque converter impeller 285 is mechanically coupled to transmission pump 289. Mechanically driven transmission pump 289 supplies pressurized transmission fluid to gear clutches (e.g., gear clutches 1-10). Torque converter 206 also includes a turbine 286 which is coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked closed. TCC is electrically operated by controller 12. Alternatively, TCC may be hydraulically locked closed. In one example, the torque converter may be referred to as a component of the transmission. Further, TCC may be partially closed, which provides an adjustable torque capacity for the TCC. The TCC provides a friction torque path through torque converter 206 while torque may also be transferred via fluid between impeller 285 and turbine 286. Torque transferred via fluid follows a fluidic torque path from impeller 285 to turbine 286.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted via adjusting torque capacity of the TCC. The controller 12 may be configured to adjust the amount of torque transmitted by torque converter 212 by adjusting the torque converter lock-up clutch application pressure or force in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel calipers 218. In one example, wheel calipers 218 may be engaged in response to the driver pressing their foot on a caliper pedal as shown in FIG. 1. In other examples, controller 12 or a controller linked to controller 12 may apply engage wheel calipers. In the same way, a frictional force may be reduced to wheels 216 by disengaging wheel calipers 218 in response to the driver releasing their foot from a caliper pedal. Further, vehicle calipers may apply a frictional force to wheels 216 via controller 12 as part of an automated engine stopping procedure.

Automatic transmission 208 also includes a power take-off 238 (e.g., an accessory drive) which extracts power from automatic transmission 208 to power on-board vehicle accessories. The accessories may include but are not limited to an alternator 231, an air conditioning compressor 230, a pump 233 (e.g., air pump, vacuum pump, etc.), and a power steering pump 232. Alternator 231 may supply electrical power to electrical consumers 234 (e.g., a battery, lights, sensors, actuators). In one example, power take-off 238 is comprised of one or more gears such that the accessories may be driven at a multiple of vehicle speed and not a multiple of engine speed if the TCC is open. Power take-off 238 may be mechanically coupled to impeller 286, input shaft 270, or another transmission component that is mechanically coupled to input shaft 270. Power take-off clutch 239 may be opened to decouple accessories (e.g., 230-234) from transmission input shaft 270. Power take-off clutch 239 may be closed to couple accessories (e.g., 230-234) to transmission input shaft 270. Power take-off 238 may provide output via a pulley or gears and mechanical linkage 235 such as belts or gears.

Thus, engine 10 may be the sole adjustable torque source that provides positive torque to powertrain 200. Alternatively, the powertrain may include engine 10 along with an optional motor/generator (not shown). Torque flows from engine 10 to transmission 208 before being applied to wheels 216. Thus, engine 10 is upstream of torque converter 206, transmission 208, and wheels 216 in a direction of torque flow. Further, torque converter 206 is upstream of forward clutch 210 and gear clutches 211.

Controller 12 may be configured to receive inputs from engine 10, as shown in more detail in FIG. 1, and accordingly control a torque output of the engine and/or operation of the torque converter, transmission, clutches, and/or wheel calipers. Further, controller 12 may receive driver input from man/machine interface 299. In some examples, man/machine interface 299 may provide powertrain information and indications to a driver. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may also supply vehicle data (e.g., engine operating conditions, idle time, etc.) to a remote server 298 via a cellular network (not shown) or satellite (not shown). Controller 12 may also receive data and commands from remote server 298.

The system of FIGS. 1 and 2 provides for a vehicle system, comprising: an engine; a transmission including a torque converter, a power take-off positioned downstream of the torque converter and upstream of a transmission output shaft; and a controller including executable instructions stored in non-transitory memory that cause the controller to adjust a rotational speed of the engine when the power take-off is engaged and no power take-off use is determined in response to an actual total amount of time the engine is operating at idle conditions exceeding a threshold amount of time, where the actual total amount of time the engine is operating at idle conditions begins at a time that the engine most recently entered idle conditions. In a first example, the vehicle system includes where no power take-off use is determined based on engine load being less than a threshold load. In a second example that may include the first example, the vehicle system includes where the rotational speed of the engine is adjusted to a lower rotational speed. In a third example that may include one or both of the first and second examples, the vehicle system further comprises additional instructions that cause the controller to adjust the rotational speed of the engine when the power take-off is engaged and power take-off use is determined in response to an actual total amount of time the engine is operating at idle conditions exceeding a threshold amount of time, where the actual total time amount of time the engine is operating at idle conditions begins at a time the engine most recently entered idle conditions. In a fourth example that may include one or more of the first through third examples, the vehicle system further comprises additional executable instructions that cause the controller to adjust an amount of time it takes to adjust the rotational speed of the engine from a first rotational speed to a second rotational speed in response to a change in engine load. The vehicle system of claim 12, further comprising additional executable instructions that cause the controller to adjust an amount of time it takes the controller to determine an average engine power or engine load according to engine power or engine load. In a fifth example that may include one or more of the first through fourth examples, the vehicle system further comprises additional executable instructions that cause the controller to compare a present engine efficiency with a predetermined engine efficiency as a basis for adjusting the rotational speed of the engine. In a sixth example that may include one or more of the first through fifth examples, the vehicle system includes where adjusting the rotational speed of the engine includes one of increasing the rotational speed of the engine, decreasing the rotational speed of the engine, or maintaining the rotational speed of the engine.

Referring now to FIG. 3, plots of a prophetic vehicle power take-off operating sequence is shown. The plots of FIG. 3 are aligned in time. The sequence may be provided by the system of FIGS. 1 and 2 according to the method of FIG. 4. Vertical markers t0-t2 represent times of particular interest in the sequence.

The first plot from the top of FIG. 3 is a plot of power take-off (PTO) operating state versus time. The vertical axis represents the power take-off operating state and the power take-off is active and engaged (e.g., the driveline is mechanically coupled to accessories, because the power take-off clutch is closed, for example) when trace 302 is at a high level that is near the vertical axis arrow. The power take-off is not activated (e.g., the driveline is not mechanically coupled to accessories, because the power take-off clutch is open, for example) when trace 302 is at a low level that is near the vertical axis arrow. The horizontal axis represents time and time increases from the left side of FIG. 3 to the right side of FIG. 3.

The second plot from the top of FIG. 3 is a plot of automatic power take-off adjustment state versus time. The vertical axis represents the automatic power take-off adjustment state and operation of the power take-off may be adjusted via a controller when trace 304 is at a higher level that is near the vertical axis arrow. Operation of the power take-off may not be adjusted automatically when trace 304 is at a lower level that is near the horizontal axis. The horizontal axis represents time and time increases from the left side of FIG. 3 to the right side of FIG. 3.

The third plot from the top of FIG. 3 is a plot of engine speed (e.g., engine rotational speed) versus time. The vertical axis represents engine speed and engine speed increases in the direction of the vertical axis arrow. The horizontal axis represents time and time increases from the left side of FIG. 3 to the right side of FIG. 3.

The fourth plot from the top of FIG. 3 is a plot of engine idle state (e.g., an engine state where engine load is less than a threshold load and the vehicle in which the engine resides is not moving with respect to earth) versus time. The vertical axis represents engine idle state and the engine is in an idle state when trace 308 is at a higher level that is close to the vertical axis arrow. The engine is not in the idle state when trace 308 is near the horizontal axis. The horizontal axis represents time and time increases from the left side of FIG. 3 to the right side of FIG. 3.

At time t0, the power take-off is engaged and the engine is in idle state. The automatic power take-off is activated so that the controller may automatically adjust vehicle operation in response to power take-off operating conditions. The engine speed is at an elevated idle speed.

At time t1, the engine has been at an elevated idle speed for longer than a threshold amount of time so the controller automatically adjusts engine speed to decrease fuel consumption and engine wear. In this example, the engine speed is reduced. In other examples, the engine speed may be increased if increasing engine speed increases engine efficiency.

At time t2, a vehicle operator deactivates automatic power take-off adjustments. Therefore, the controller reverts to power take-off operating conditions that have been manually entered or are baseline power take-off operating conditions. In this example, the manual power take-off engine speed is increased slightly. The power take-off remains engaged and the engine remains in idle state.

In this way, vehicle operating conditions may be adjusted when an engine is idling and a power take-off is engaged. Automatic control may reduce engine fuel consumption and engine wear. Manual control may allow a user to operate the vehicle in a specific way based on conditions that the controller may be unaware of (e.g., requirements of devices that are mechanically coupled to the powertrain via the power take-off).

Figure 4:
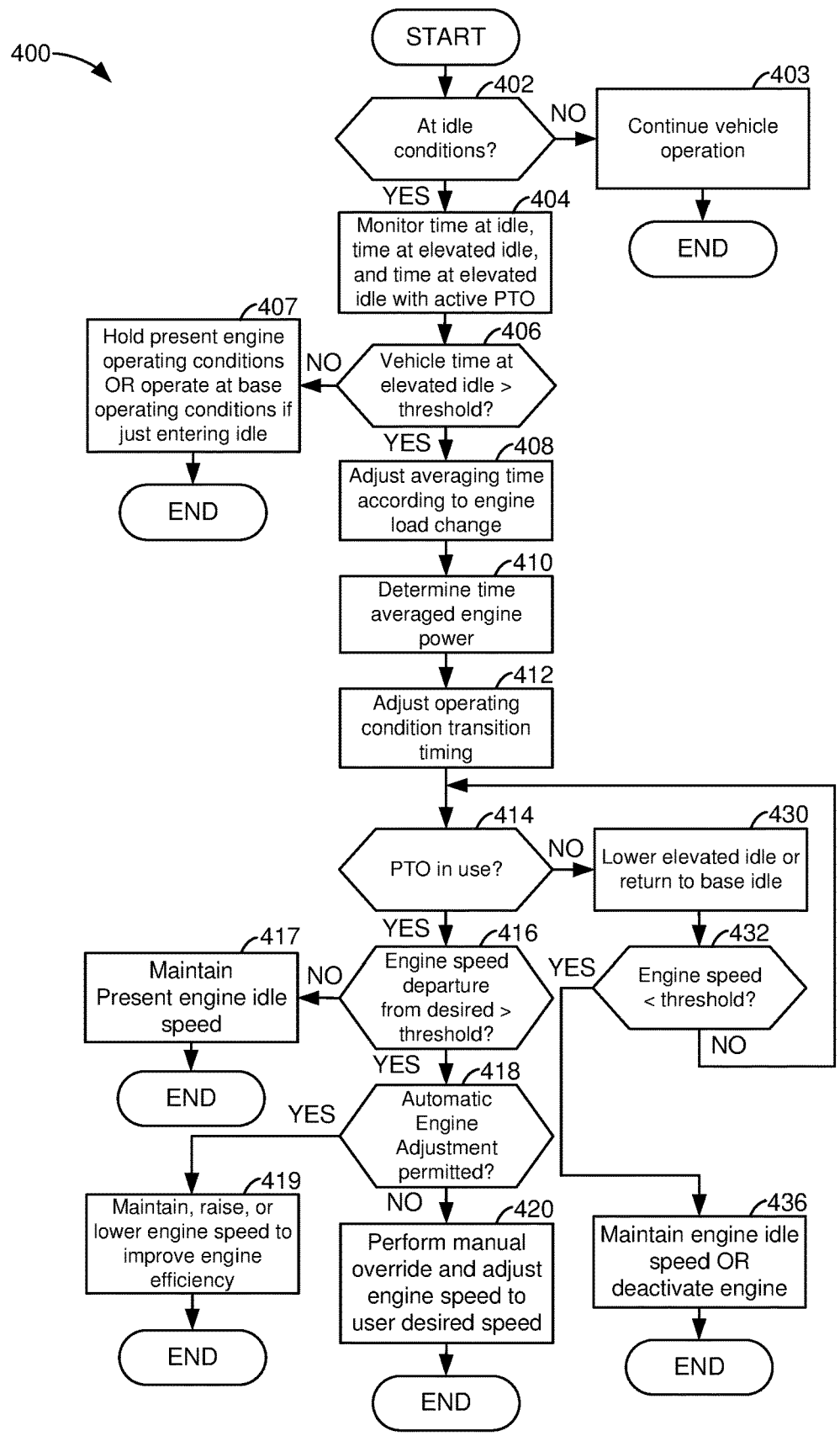
FIG. 4 shows an example method for operating a vehicle.
Figure 5:
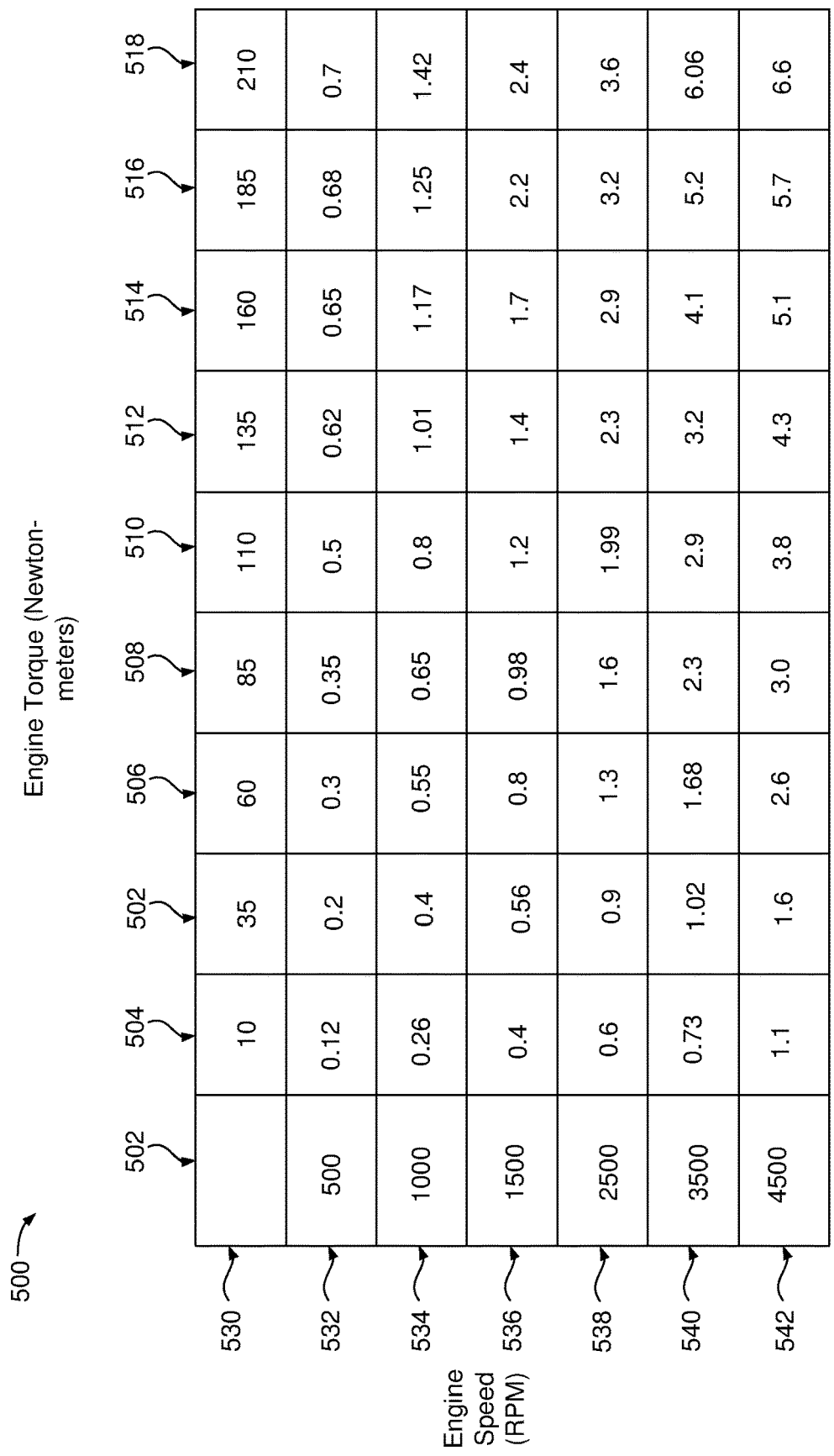
FIG. 5 shows a plot of an example engine fuel consumption map.

Referring now to FIG. 4, a method for operating a vehicle that includes a power take-off is shown. The method of FIG. 4 may be applied to the powertrain shown in FIGS. 1 and 2. Further, at least portions of the method of FIG. 4 may be included as executable instructions stored in in one or more controllers of a system (e.g., the system of FIGS. 1 and 2). Additionally, at least portions of the method of FIG. 4 may be actions taken within the physical world to transform states of devices.

At 402, method 400 judges if an engine of a vehicle that includes a power take-off is at idle conditions. Idle conditions may include an engine load (e.g., actual or estimated air flow into the engine divided by the maximum theoretical air flow through the engine at the engine's present operating conditions) that is less than a threshold load and zero vehicle speed. If method 400 judges that the engine is at idle conditions, the answer is yes and method 400 proceeds to 404. Otherwise, the answer is no and method 400 proceeds to 403.

At 403, method 400 continues vehicle operation according to the vehicle's present operating conditions. Method 400 proceeds to exit.

At 404, method 400 monitors an actual total amount of time that the engine has continuously been at idle operating conditions beginning from a time when the engine most recently entered idle conditions. Method 400 also monitors an actual total amount of time that the engine has continuously been at elevated idle (e.g., where the engine is operated at idle at a rotational speed that is greater than a threshold speed) operating conditions beginning from a time when the engine most recently entered elevated idle conditions. Further, method 400 monitors an actual total amount of time that the engine has continuously been at elevated idle operating conditions with the power take-off activated beginning from a time when the engine most recently entered elevated idle conditions. Method 400 may also determine the actual total amount of time the engine has been continuously operated at idle beginning from the most recent time the engine entered idle conditions divided by the actual total amount of time the engine has been operating since the most recent engine start. Additionally, method 400 may also determine the actual total amount of time the engine has been continuously operated at elevated idle beginning from the most recent time the engine entered elevated idle conditions divided by the actual total amount of time the engine has been operating since the most recent engine start. In some examples, method 400 may determine an actual total amount of time that the engine has operated at elevated idle speed since the most recent time the engine entered elevated idle speed conditions without the power take-off being activated. Method 400 may determine these conditions via a timer in the controller and engine operating conditions (e.g., engine load, engine speed, vehicle speed, etc.).

Method 400 may transmit these and other operating conditions to an external server or cloud via satellite, wifi, or cellular network. Further, based on these operating conditions, the controller or external server may schedule the vehicle for oil changes and other maintenance. Additionally, the previously determined conditions and/or parameters may be determined for specific time intervals (e.g., 4 hours) and/or the entire life of the vehicle. Method 400 proceeds to 406.

At 406, method 400 judges whether or not the actual total amount of time that the vehicle has been at elevated idle conditions since the vehicle most recently entered elevated idle conditions, or since a different time or condition, exceeds a threshold amount of time. If so, the answer is yes and method 400 proceeds to 408. Otherwise, the answer is no and method 400 proceeds to 407. In this way, method 400 determines that the engine has been at uninterrupted idle (e.g., has not exited idle) for a threshold amount of time before proceeding to step 408.

Method 400 may determine that the engine is at idle conditions when engine load is less than a threshold engine load (e.g., 0.06 engine load) and vehicle speed is zero when a power take-off is not engaged (e.g., the power take-off clutch is fully open). Further, method 400 may determine that the engine is at idle conditions when engine load is less than a second threshold engine load (e.g., 0.07 engine load) and vehicle speed is zero when the power take-off is engaged (e.g., the power take-off clutch is fully closed).

At 407, method 400 holds the engine at its present operating conditions (e.g., speed and load). Alternatively, method 400 may operate the engine at base idle conditions if the engine is entering idle conditions from off-idle conditions. Method 400 proceeds to exit.

At 408, method 400 adjusts an amount of time T that engine power output, or additionally or alternatively engine load, is averaged to determine an averaged engine power. In one example, the amount of time for determining an averaged engine power output or engine load is based on an estimated power take-off load. For example, for larger power take-off loads (e.g., greater than or equal to 10 kilowatts), the amount of time that engine load or engine power is averaged may be smaller (e.g., between 5 and 10 seconds). For smaller power take-off loads (e.g., less than 10 kilowatts), the amount of time that the engine load or engine power is averaged may be larger (e.g., between 60 and 120 seconds). Method 400 proceeds to 410 after determining the amount of time (T) that engine power and/or load is to be averaged over is determined.

At 410, method 400 determines a time averaged amount of power that is generated by the engine at present engine operating conditions. Method 400 may generate the time averaged power that is generated by the engine via the following equation:

$$Peng = \frac{1}{n}\sum_{i=1}^{n} Teng(i) \cdot \frac{(2\pi \cdot Neng(i))}{60}$$

where Peng is engine power, n is the actual total number of engine torque and engine speed data samples in a predetermined time interval (e.g., T), Teng is engine torque, Neng is engine speed, and i is the sample number in the predetermined time interval (e.g., 10 seconds). Thus, if the controller has a sample rate of one hundred samples per second and the predetermined time interval is 10 seconds, n will be 1000. Method 400 may adjust the predetermined time interval T as discussed below and the controller may sample engine operating conditions at a predetermined interval (e.g., each 10 milliseconds interval).

Method 400 may determine an averaged engine load value via the following equation:

$$Leng = \frac{1}{n}\sum_{i=1}^{n} Leng(i)$$

where Leng is engine load and n is the actual total number of engine torque and engine speed data samples in a predetermined time interval (e.g., T). Method 400 proceeds to 412.

At 412, method 400 adjusts an amount of time ($T_{take-off}$) method 400 takes to change the engine and power take-off from a first engine and power take-off operating condition to a second engine and power take-off operating condition. In one example, the amount of time method 400 takes to change the engine and power take-off from the first engine and power take-off operating condition to the second engine and power take-off operating condition may be adjusted in response to historical engine and power take-off operation. For example, method 400 may determine $T_{take-off}$ as a function of a ratio of a total amount of time the engine operated at an elevated idle speed with no power take-off usage over the life of the vehicle to a total amount of time the engine operated at the elevated idle speed with power take-off usage over the life of the vehicle. In other examples, method 400 may determine $T_{take-off}$ as a function of the one or more of the monitored conditions described at 404. Method 400 proceeds to 414.

At 414, method 400 judges whether or not the power take-off is in use. In one example, method 400 may judge whether or not the power take-off is in use based on a comparison of engine load at the engine's present rotational speed with an engine load at the engine's present rotational speed and a minimum power take-off load. The power take-off may be engaged (e.g., the power take-off clutch is fully closed) when it is determined whether or not the power take-off is in use. For example, if engine load at 2000 RPM engine speed is 0.05 at present operating conditions and engine load at 2000 RPM engine speed is 0.09 with a minimum power take-off load, method 400 may judge that a power take-off is in use when engine load is equal to or greater than 0.09 load at an engine speed of 2000 RPM. This approach may have an advantage of adjusting engine operation based on the magnitude of the power take-off load, which may be indicative of how the power take-off may operate after the adjustment.

In other examples, method 400 may determine whether or not the power take-off is in use according to an operating state of the power take-off clutch instead of engine load. For example, if the power take-off clutch is fully closed, method 400 may judge that the power take-off is in use. If the power take-off clutch is fully open, method 400 may judge that the power take-off is not in use. This approach may have an advantage of adjusting engine operation based on actual power take-off state, which may ensure that engine adjustments are indeed based on power take-off state. If method 400 judges that the power take-off is in use, the answer is yes and method 400 proceeds to 416. Otherwise, the answer is no and method 400 proceeds to 430.

At 430, method 400 reduces the elevated engine idle speed via a predetermined engine speed reduction amount (e.g., 50 revolutions/minute). The elevated engine idle speed is an engine idle speed that is greater than a baseline engine idle speed. For example, a baseline engine idle speed may be 650 revolutions/minute for an engine while an elevated engine idle speed for the same engine may be 1200 revolutions/minute. Method 400 proceeds to 432.

At 432, method 400 judges whether or not present engine rotational speed is less than a threshold rotational speed. If so, the answer is yes and method 400 proceeds to 436. If not, the answer is no and method 400 returns to 414.

At 436, method 400 maintains the engine's present idle speed, or alternative, deactivated the engine by ceasing to supply fuel to the engine. The engine idle speed may be maintained at a lower idle speed during conditions where the controller has not been granted permission to deactivate the engine. The engine may be deactivated when there may be longer periods of engine idle without the power take-off being engaged or in use. The engine idle speed may be maintained when there are shorter periods of engine idle without the power take-off being engaged or in use or if the controller has not ben granted permission to deactivate the engine. Method 400 proceeds to exit.

At 416, method 400 judges whether or not engine idle speed is more than a threshold amount of engine speed away from a requested or target engine idle speed. For example, if a target engine speed is 1000 revolutions/minute and the threshold engine speed is 50 revolutions/minute, method 400 may judge that engine idle speed is more than a threshold amount of engine speed away from the target engine speed of 1000 revolutions/minute if present engine speed is greater than 1050 revolutions/minute or less than 950 revolutions/minute.

Alternatively, method 400 may judge whether or not engine efficiency is more than a threshold engine efficiency away from a requested or target engine efficiency. The engine's efficiency, or another variable indicative of engine efficiency (e.g., engine fuel consumption divided by engine power generated), may be mapped as a function of engine speed and engine load. For example, if a target engine efficiency speed is 10% at an engine load of 0.2 and the threshold engine efficiency is 2%, method 400 may judge that engine efficiency is more than a threshold amount of engine efficiency away from the target engine efficiency of 10% if present engine efficiency is less than 8%. If method 400 judges that engine idle speed is more than a threshold amount of engine speed away from a requested or target engine idle speed, or if method 400 judges that engine efficiency is more than a threshold engine efficiency away from a requested or target engine efficiency, the answer is yes and method 400 proceeds to 418. Otherwise, the answer is no and method 400 proceeds to 417.

At 417, method 400 maintains the present engine idle speed. The present engine idle speed may be maintained by maintaining the present engine air flow rate, the present engine fuel flow, and the present spark timing. Method 400 proceeds to exit.

At 418, method 400 judges whether or not automatic adjustment of engine operation is permitted to meet engine fuel economy and engine degradation metrics. If automatic adjustment of engine operation is permitted, the answer is yes and method 400 proceeds to 419. If automatic adjustment of engine operation is not permitted, the answer is no and method 400 proceeds to 420.

At 419, method 400 maintains, raises, or lowers engine speed to maintain or increase engine efficiency. In one example, method 400 may adjust engine speed according to an engine efficiency map or a map that is representative of engine fuel efficiency (e.g., a map that relates engine fuel consumption divided by engine power generated to engine speed and engine load). For example, if the engine is presently operating at 1200 revolutions/minute at 10% efficiency and engine efficiency may be increased to 10.5% by decreasing engine speed to 1000 revolutions/minute, method 400 reduces engine speed. The engine speed may be adjusted by increasing/decreasing the engine air flow or increasing/decreasing spark timing, for example. In some examples, engine speed may be adjusted via increasing/decreasing fuel injection timing.

In another example, method 400 adjust engine speed according to an engine fuel consumption map. For example, if the engine is presently operating at 1200 revolutions/minute at fuel consumption of 6 liters/hour and engine fuel consumption may be reduced to 5.5 liters/hour by decreasing engine speed to 1000 revolutions/minute, method 400 reduces engine speed. The engine speed may be adjusted by increasing/decreasing the engine air flow or increasing/decreasing spark timing, for example. In some examples, engine speed may be adjusted via increasing/decreasing fuel injection timing.

Method 400 may make the change in engine speed from a first engine speed to a second engine speed at a rate as determined at 412. Method 400 proceeds to exit.

At 420, method 400 performs manual override of the present engine operating conditions. Therefore, if engine speed is presently 1400 revolutions/minute and the user input manual engine speed is 1350 revolutions/minute, the controller adjusts engine speed to 1350 revolutions/minute. The engine speed may be adjusted by increasing/decreasing the engine air flow or increasing/decreasing spark timing, for example. In some examples, engine speed may be adjusted via increasing/decreasing fuel injection timing.

In this way, engine operation at idle conditions may be adjusted to increase engine fuel economy when a power take-off device is activated or deactivated. Additionally, the rate that engine speed is changed from a first engine speed to a second engine speed may be adjusted to meet performance and fuel economy objectives. Likewise, averaging of engine power and engine load may be adjusted to increase engine and/or power take-off performance metrics.

The method of FIG. 5 provides for a method for operating a powertrain of a vehicle, comprising: via a controller, adjusting an engine rotational speed when a power take-off positioned downstream of a torque converter is engaged in response to an actual total amount of time an engine is at idle conditions exceeding a threshold amount of time and engine efficiency being more than a threshold engine efficiency away from a predetermined engine efficiency, where the actual total amount of time the engine is at idle begins from a most recent time the engine entered idle conditions. In a first example, the method includes where adjusting the engine rotational speed includes increasing engine rotational speed. In a second example that may include the first example, the method includes where adjusting the engine rotational speed includes decreasing engine rotational speed. In a third example that may include one or both of the first and second examples, the method further comprises adjusting an amount of time it takes to adjust the engine rotational speed from a first engine rotational speed to a second engine rotational speed in response to historic engine operating data. In a fourth example that may include one or more of the first through third examples, the method includes where the historic engine operating data includes an amount of time operating at a first elevated engine idle speed with no power take-off use to an amount of time operating at a second elevated engine idle speed with power take-off use. In a fifth example that may include one or more of the first through fourth methods, the method includes where adjusting the engine rotational speed includes adjusting the engine rotational speed to a rotational speed that increases engine efficiency. In a sixth example that may include one or more of the first through fifth examples, the method further comprises determining a time averaged engine power in response to operating an engine at an elevated idle rotational speed for longer than a threshold amount of time.

The method of FIG. 4 also provides for a method for operating a powertrain of a vehicle, comprising: via a controller, adjusting operation of an engine in response to a present engine efficiency, an assessment of whether or not a power take-off is operating an external device, and the engine being at uninterrupted idle conditions for longer than a predetermined amount of time. In a first example, the method includes where the assessment of whether or not the power take-off is operating an external device is based on engine load. In a second example that may include the first example, the method includes where adjusting operation of the engine includes one of increasing engine speed, decreasing engine speed, or maintaining engine speed. In a third example that may include one or both of the first and second examples, the method further comprises additional instructions to adjust operation of the engine in further response to engine efficiency. In a fourth example that may include one or more of the first through third examples, the method further comprises additional instructions to monitor an actual total amount of time the engine is operating at idle conditions since the engine most recently entered idle conditions.

Referring now to FIG. 5, an example prophetic map of engine fuel consumption is shown. The engine fuel consumption map may be a basis for determining a target or desired engine speed when the engine and power take-off are under automatic control. Similar maps may be generated using engine speed and engine load or engine speed and engine efficiency reference variables to determine if engine fuel consumption may be increased or decreased via increasing or decreasing engine speed.

Engine fuel consumption map 500 includes rows 530-542 and columns 502-518. The second through seventh rows 532-542 in column one 502 hold engine rotational speed values. The second through tenth columns 504-518 in first row 530 hold engine torque values. The second through tenth columns 504-518 and their associated rows 532-542 hold engine fuel consumption values in units of grams/second.

The controller (e.g., element 12 in FIG. 1) may read values in the map and determine whether or not adjusting engine speed may increase or decrease engine fuel consumption so that fuel consumption may be lowered. For example, if the engine is generating 35 Newton-meters of torque at 1000 RPM (e.g., the map cell at column 504 and row 534), the controller may determine that engine fuel efficiency may be increased by reducing engine speed since engine fuel consumption is lower in map cell at column 504 and row 532 as compared to the engine fuel consumption value at column 504 and row 534. Thus, map 500 or similar maps may be basis for adjusting engine speed to increase or decrease fuel consumption.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a powertrain of a vehicle, comprising:
via a controller, adjusting an engine rotational speed when a power take-off positioned downstream of a torque converter is engaged in response to an actual total amount of time an engine is at idle conditions exceeding a threshold amount of time and engine efficiency being more than a threshold engine efficiency away from a predetermined engine efficiency, where the actual total amount of time the engine is at idle begins from a most recent time the engine entered idle conditions, and where adjusting the engine rotational speed includes increasing engine rotational speed.

2. The method of claim 1, further comprising adjusting a first amount of time it takes to adjust the engine rotational speed from a first engine rotational speed to a second engine rotational speed in response to historic engine operating data.

3. The method of claim 2, where the historic engine operating data includes a second amount of time operating at a first elevated engine idle speed with no power take-off use to an amount of time operating at a second elevated engine idle speed with power take-off use.

4. The method of claim 3, where adjusting the engine rotational speed includes adjusting the engine rotational speed to a rotational speed that increases engine efficiency.

5. A method for operating a powertrain of a vehicle, comprising:
via a controller, adjusting an engine rotational speed when a power take-off positioned downstream of a torque converter is engaged in response to an actual total amount of time an engine is at idle conditions exceeding a threshold amount of time and engine efficiency being more than a threshold engine efficiency away from a predetermined engine efficiency, where the actual total amount of time the engine is at idle begins from a most recent time the engine entered idle conditions, the method further comprising determining a time averaged engine power in response to operating the engine at an elevated idle rotational speed for longer than the threshold amount of time.

6. A vehicle system, comprising:
an engine;
a transmission including a torque converter, a power take-off positioned downstream of the torque converter and upstream of a transmission output shaft; and
a controller including executable instructions stored in non-transitory memory that cause the controller to adjust a rotational speed of the engine when the power take-off is engaged and no power take-off use is determined in response to an actual total amount of time the engine is operating at idle conditions exceeding a threshold amount of time, where the actual total amount of time the engine is operating at idle conditions begins at a time that the engine most recently entered idle conditions, and where no power take-off use is determined based on engine load being less than a threshold load.

7. The vehicle system of claim 6, further comprising additional instructions that cause the controller to adjust the rotational speed of the engine when the power take-off is engaged and power take-off use is determined in response to a second actual total amount of time the engine is operating at idle conditions exceeding the threshold amount of time, where the second actual total amount of time the engine is operating at idle conditions begins at the time the engine most recently entered idle conditions.

8. The vehicle system of claim 6, further comprising additional executable instructions that cause the controller to adjust an amount of time it takes to adjust the rotational speed of the engine from a first rotational speed to a second rotational speed in response to a change in engine load.

9. The vehicle system of claim 8, further comprising additional executable instructions that cause the controller to adjust a second amount of time it takes the controller to determine an average engine power or engine load according to engine power or engine load.

10. The vehicle system of claim 9, further comprising additional executable instructions that cause the controller to compare a present engine efficiency with a predetermined engine efficiency as a basis for adjusting the rotational speed of the engine.

11. The vehicle system of claim 6, where adjusting the rotational speed of the engine includes one of increasing the rotational speed of the engine, decreasing the rotational speed of the engine, or maintaining the rotational speed of the engine.

12. A method for operating a powertrain of a vehicle, comprising:
via a controller, adjusting operation of an engine in response to a present engine efficiency, an assessment of whether or not a power take-off is operating an external device, and the engine being at uninterrupted idle conditions for longer than a predetermined amount of time, where the assessment of whether or not the power take-off is operating the external device is based on engine load.

13. The method of claim 12, where adjusting operation of the engine includes one of increasing engine speed, decreasing engine speed, or maintaining engine speed.

14. The method of claim 12, further comprising additional instructions to adjust operation of the engine in further response to engine efficiency.

15. The method of claim 12, further comprising additional instructions to monitor an actual total amount of time the engine is operating at idle conditions since the engine most recently entered idle conditions.

\* \* \* \* \*